(12) United States Patent
Mauldin et al.

(10) Patent No.: US 7,253,136 B2
(45) Date of Patent: Aug. 7, 2007

(54) PREPARATION OF TITANIA AND COBALT ALUMINATE CATALYST SUPPORTS AND THEIR USE IN FISCHER-TROPSCH SYNTHESIS

(75) Inventors: Charles H. Mauldin, Baton Rouge, LA (US); Louis F. Burns, Baton Rouge, LA (US)

(73) Assignee: ExxonMobile Research and Engineering Company, Annandale, NJ (US)

( * ) Notice: Subject to any disclaimer, the term of this patent is extended or adjusted under 35 U.S.C. 154(b) by 95 days.

(21) Appl. No.: 10/819,384

(22) Filed: Apr. 6, 2004

(65) Prior Publication Data
US 2004/0204506 A1   Oct. 14, 2004

Related U.S. Application Data

(60) Provisional application No. 60/462,017, filed on Apr. 11, 2003.

(51) Int. Cl.
*B01J 23/00* (2006.01)
*B01J 21/00* (2006.01)
*B01J 20/00* (2006.01)

(52) U.S. Cl. ............ 502/327; 502/242; 502/332; 502/351; 502/355; 502/414; 502/415; 502/439

(58) Field of Classification Search .......... 502/242, 502/326, 327, 332, 349–351, 355, 414, 415, 502/439
See application file for complete search history.

(56) References Cited

U.S. PATENT DOCUMENTS

| | | | | |
|---|---|---|---|---|
| 3,748,165 A | * | 7/1973 | Hill ........................... | 106/440 |
| 4,681,867 A | * | 7/1987 | Dyer et al. ................ | 502/242 |
| 4,794,099 A | * | 12/1988 | Iglesia et al. ............. | 502/241 |
| 4,962,078 A | * | 10/1990 | Behrmann et al. ........ | 502/325 |
| 4,977,126 A | * | 12/1990 | Mauldin et al. ........... | 502/242 |
| 4,981,831 A | * | 1/1991 | Knudsen et al. .......... | 502/236 |
| 4,992,406 A | | 2/1991 | Mauldin et al. ........... | 502/304 |
| 5,036,032 A | * | 7/1991 | Iglesia et al. ............. | 502/260 |
| 5,037,791 A | * | 8/1991 | Comolli et al. ........... | 502/185 |
| 5,478,789 A | * | 12/1995 | Hattori et al. ............. | 502/244 |
| 5,856,260 A | | 1/1999 | Mauldin .................... | 502/325 |
| 5,856,261 A | | 1/1999 | Culross et al. ............ | 502/325 |
| 5,863,856 A | | 1/1999 | Mauldin .................... | 502/325 |

(Continued)

FOREIGN PATENT DOCUMENTS

| | | |
|---|---|---|
| EP | 0450861 A2 | 10/1991 |
| EP | 1239019 A1 | 9/2002 |
| WO | WO99/42214 | 8/1999 |

OTHER PUBLICATIONS

Tan Junru, et al., "The Preparation and Characteristics of Cobalt Blue Mica Coated Titania Pearlescent Pigment", Dyes and Pigments 52 (2002) pp. 215-222.

(Continued)

*Primary Examiner*—Cam N. Nguyen
(74) *Attorney, Agent, or Firm*—Estelle C. Bakun; Joseph J. Allocca

(57) ABSTRACT

Supports for Fischer-Tropsch catalysts are formed by forming a particulate material from titania, alumina and optionally silica. A cobalt compound is incorporated into the particulate material which then is calcined to convert at least part of the alumina to cobalt aluminate.

14 Claims, 3 Drawing Sheets

U.S. PATENT DOCUMENTS

| | | | |
|---|---|---|---|
| 5,922,294 A * | 7/1999 | Chattha et al. | 423/213.5 |
| 5,935,897 A * | 8/1999 | Trubenbach et al. | 502/150 |
| 6,087,405 A | 7/2000 | Plecha et al. | 518/715 |
| 6,117,814 A | 9/2000 | Plecha et al. | 502/325 |
| 6,124,367 A * | 9/2000 | Plecha et al. | 518/715 |
| 6,159,897 A * | 12/2000 | Suzuki et al. | 502/351 |
| 6,191,066 B1 * | 2/2001 | Singleton et al. | 502/332 |
| 6,235,677 B1 * | 5/2001 | Manzer et al. | 502/232 |
| 6,482,766 B1 * | 11/2002 | Chaumette et al. | 502/242 |
| 6,638,889 B1 * | 10/2003 | Van Berge et al. | 502/300 |
| 6,897,177 B2 * | 5/2005 | Van Berge et al. | 502/185 |
| 6,977,237 B2 * | 12/2005 | Geerlings et al. | 502/326 |
| 2002/0107142 A1 * | 8/2002 | Yamazaki et al. | 502/339 |
| 2002/0165092 A1 * | 11/2002 | Zhang et al. | 502/330 |
| 2003/0108722 A1 * | 6/2003 | Yoda et al. | 428/195 |

OTHER PUBLICATIONS

Rachid Oukaci, et al., "Comparison of Patented Co F-T Catalysts Using Fixed-Bed and Slurry Bubble Column Reactors", Applied Catalysis A: General 186 (1999) pp. 129-144.

* cited by examiner

PREPARATION OF TITANIA AND COBALT ALUMINATE CATALYST SUPPORTS AND THEIR USE IN FISCHER-TROPSCH SYNTHESIS

This application claims the benefit of U.S. Provisional Application No. 60/462,017 filed Apr. 11, 2003.

FIELD OF THE INVENTION

This invention relates to titania and cobalt aluminate containing catalyst supports. It also relates to use of the supports and a catalytic component in Fischer-Tropsch hydrocarbon synthesis whereby the alpha is improved and the selectivity of the process to higher hydrocarbons is enhanced.

BACKGROUND OF THE INVENTION

The Fischer-Tropsch process was developed in the 1920's as a way of producing hydrocarbons from synthesis gas, i.e., hydrogen and carbon monoxide. Initially, the process was centered on producing gasoline range hydrocarbons as automotive fuels. Today, however, the Fischer-Tropsch process is increasingly viewed as a method for preparing heavier hydrocarbons such as diesel fuels, and more preferably waxy molecules for conversion to clean, efficient lubricants. Thus, the importance of catalysts for producing higher boiling hydrocarbons, i.e. a product slate containing a higher carbon number distribution, is ever increasing. A measure of the carbon number distribution is the Schulz-Flory alpha value, which represents the probability of making the next higher carbon number from a given carbon number. The Schulz-Flory distribution is expressed mathematically by the Schulz-Flory equation:

$$W_i = (1-\alpha)^2 i \alpha^{i-1}$$

Where i represents carbon number, $\alpha$ is the Schulz-Flory distribution factor which represents the ratio of the rate of chain propagation to the rate of chain propagation plus the rate of chain termination, and $W_i$ represents the weight fraction of product of carbon number i. Alpha numbers above about 0.9 are, in general, representative of wax producing processes and the higher the alpha number—as it approaches 1.0—the more selective the process is for producing wax molecules.

The catalysts usually employed in the Fischer-Tropsch process are iron and cobalt; ruthenium has the requisite catalytic activity for use in the process but is expensive and is in relatively short supply. Promoters, like rhenium, zirconium, manganese, and the like, are commonly used, especially with cobalt, to improve various aspects of catalytic performance.

These catalysts are typically supported on a particulate material composed primarily of alumina or titania.

Experience has shown that the operating conditions for Fischer-Tropsch synthesis, especially when conducted in a slurry phase, has led to a weakening of the catalysts and the formation of excessive fines in the reaction mixture. Consequently, efforts have been made to develop improved catalysts.

For example in WO 99/42214 there is disclosed modifying an alumina, titania or magnesia support with a compound selected from compounds of Si, Zr, Cu, Mn, Ba, Co, Zn, Ni or La. In U.S. Pat. No. 6,117,814 an improved support is disclosed which comprises primarily titania in which there is incorporated a binder of silica and alumina.

One object of the present invention is to provide further improved, novel titania supports.

Another object is to provide catalysts supported on such improved titania supports and to use them in the conversion of synthesis gas to achieve high selectivities with low methane formation.

SUMMARY OF INVENTION

In one embodiment an improved catalyst support comprises primarily titania and a minor amount of a binder comprising cobalt aluminate. The cobalt aluminate is incorporated in the titania support by forming the titania support with an alumina binder and thereafter reacting the alumina binder with a sufficient amount of a cobalt compound and under conditions sufficient to convert at least part and preferably substantially all of the alumina to cobalt aluminate. Thus, the support may also contain an alumina binder but preferably is substantially alumina free. Optionally the support may also contain silicon oxide as a binder.

Another embodiment of the invention comprises a Fischer-Tropsch catalyst composition comprising cobalt on a support primarily of titania and a minor amount of a binder comprising cobalt aluminate.

Yet another embodiment comprises a Fischer-Tropsch process with improved selectivity comprising reacting synthesis gas at Fischer-Tropsch reaction conditions in the presence of a supported cobalt catalyst in which the support comprises primarily titania and a minor amount of cobalt aluminate.

Other embodiments of the invention will become apparent upon a reading of the balance of the specification.

DETAILED DESCRIPTION OF INVENTION

Figure 1:
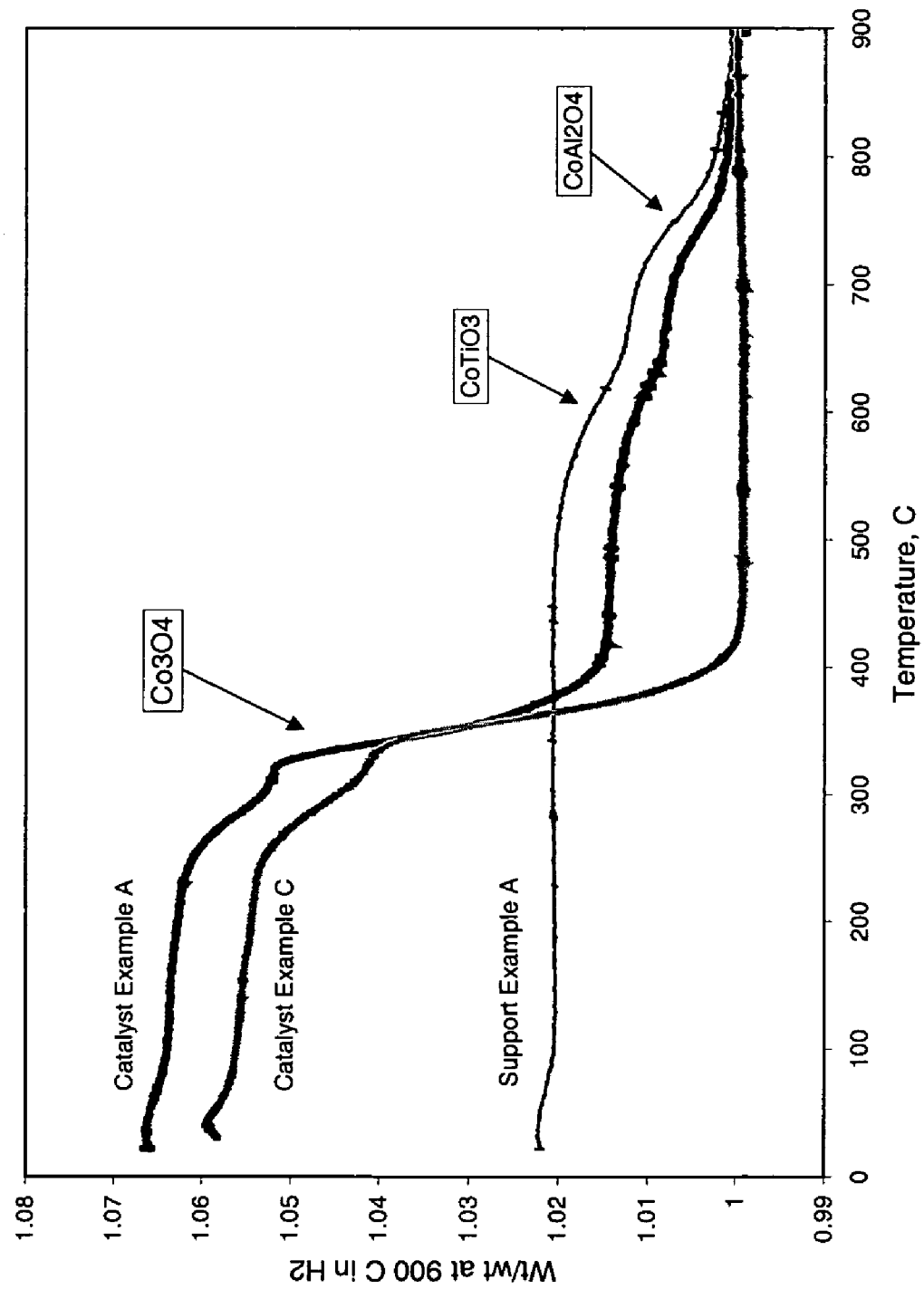
FIGS. 1, 2 and 3 are graphs of data presented in the Examples which illustrate various aspects of the present invention.

The support of the present invention is a particulate material comprising oxides of elemental titanium, aluminum, and cobalt. These oxides may be simple oxides, i.e., oxides of a single element such as $TiO_2$, $Al_2O_3$, CoO, and $Co_3O_4$ and oxides of more than one element such as $CoTiO_3$ and $CoAl_2O_4$. In any event, the support comprises primarily titania ($TiO_2$) and a minor amount of cobalt aluminate. In general the support will contain at least 50 wt % titania and preferably from 80 to about 97 wt % titania based on the total weight of the support. About 20 to 100 wt %, and preferably 60 to 98 wt % of the titania of the support is in the rutile crystalline phase with the balance being the anatase crystalline phase or amorphous phases. The amount of cobalt aluminate in the binder is dependent upon the amount of cobalt and aluminum compounds used in forming the support. Suffice it to say that sufficient cobalt is present in the support to provide a cobalt/aluminum atomic ratio greater than 0.25, preferably from 0.5 to 2, and more preferably about 1. Thus, at a Co/Al ratio of 0.25 about half the aluminum oxide is present as cobalt aluminate. At a Co/Al ratio of 0.5 substantially all the alumina oxide present is present as cobalt aluminate. At Co/Al ratios above 0.5 the support will contain cobalt titanate in addition to cobalt aluminate and be essentially free of alumina.

As previously stated the binder may also include alumina and optionally silica. In general, the binder is less than about 30 wt % of the support and preferably less than about 15 wt % of the support. Typically the binder is greater than about 3 wt % of the support. The amount of silica is less than 50 wt % of the total amount of binder, preferably 35 wt % of the binder.

Typically the support will have a surface area in the range of from about 5 m$^2$/g to about 40 m$^2$/g and preferably from 10 m$^2$/g to 30 m$^2$/g. Pore volumes range from about 0.2 cc/g to about 0.5 cc/g and preferably from 0.3 cc/g to 0.4 cc/g.

The support is typically formed by spray drying a suitable aqueous slurry of titania, alumina binder material and optionally silica binder material into a purged chamber with heated air at an outlet temperature of about 105° C. to is 135° C. Spray drying produces a spherical support with a size range of about 20 to 120 microns. This spray dried support is then calcined at temperatures in the range of 400 to 800° C., preferably about 700° C. Next the calcined material is impregnated with an aqueous solution of a cobalt compound, preferably cobalt nitrate, in an amount sufficient to convert, upon calcination, at least part of the alumina to cobalt aluminate. Preferably sufficient cobalt compound is used to convert from 50% to 99+% of the alumina to cobalt aluminate. Therefore, the amount of cobalt compound added during the preparation of the support will correspond to an atomic ratio of Co:Al in the range of 0.25:1 to 2:1 and preferably 0.5:1 to 1:1. Indeed, it is especially preferred that the support produced be substantially free of alumina.

Calcination of the cobalt impregnated support preferably is conducted in air at temperatures in the range of about 700° C. to about 1000° C., preferably about 800° C. to about 900° C.

When preparing Fischer-Tropsch catalysts from this support, metals catalytically active for the Fischer-Tropsch synthesis are composited with the support. Preferred metals are those from Group VIII of the Periodic Chart of the Elements, particularly iron, cobalt and ruthenium, with cobalt and ruthenium being preferred and cobalt being most preferred. Promoters may also be employed such as zirconium, titanium, rhenium, hafnium, cerium, thorium and uranium, and others well known to those skilled in the art. The metal or metals are present in amounts that are catalytically active for Fischer-Tropsch synthesis and will vary with the metal being selected. For example, ruthenium is much more active in this environment than cobalt and, as a consequence is used in amounts ranging from about 0.5-3.0 wt % while cobalt will preferably be used in amounts of about 2-40 wt %, more preferably 5-30 wt %, still more preferably 10-25 wt %.

When promoters are employed, they are used in quantities less than the active catalytic metal, e.g., in weight ratios of about 1/20 to 1/10 based on the active metal. The most preferred catalysts are those containing cobalt and rhenium, cobalt and ruthenium, and cobalt and thoria, particularly cobalt and rhenium.

The catalyst can be prepared by a variety of techniques well known to those skilled in the art, including impregnation (either co-impregnation with promoters or serial impregnation—either by spray drying or by the incipient wetness techniques). Since a preferred catalyst for fixed bed Fischer-Tropsch processes is one wherein the catalytic metals are present in the outer portion of the catalyst particle, i.e., in a layer no more than 250 microns deep, preferably no more than 200 microns deep, a preferred method of preparing the catalyst is the spray method which is described in U.S. Pat. No. 5,140,050, incorporated herein by reference or in EP 0,266,898, incorporated herein by reference. For slurry Fischer-Tropsch processes, catalysts are preferably made by incipient wetness impregnation of spray-dried supports. When using the incipient wetness impregnation technique, organic impregnation aids are optionally employed. Such aids are described in U.S. Pat. No. 5,856,260, U.S. Pat. No. 5,856,261 and U.S. Pat. No. 5,863,856, all incorporated herein by reference.

The Fischer-Tropsch synthesis is a well known process and the reaction conditions have been described in the available literature. For example, temperatures may range from about 175° C. to about 400° C., preferably about 180° C. to 250° C., while pressures may range from about 1 to 100 bar, preferably about 15 to 40 bar. Hydrogen/CO ratios may range from 0.5/1 to about 4/1, preferably about 1.7/1 to 2.5/1, with the stoichiometric amount plus or minus about 3% being most preferred. The catalyst made from the support of this invention is preferably used in a slurry, e.g., a slurry bubble column reactor where gas hourly space velocities may range from about 1,000 to 25,000. A preferred slurry bubble column operation is described in U.S. Pat. No. 5,348,982, incorporated herein by reference. The products produced by the process of this invention generally follow the Schulz-Flory distribution, except that the yield of methane is usually higher than expected from this distribution. This indicates that methane is apparently produced by an additional mechanism.

The hydrocarbons produced in a process as described above are typically upgraded to more valuable products by subjecting all or a portion of the $C_{5+}$ hydrocarbons to fractionation and/or conversion. By "conversion" is meant one or more operations in which the molecular structure of at least a portion of the hydrocarbon is changed and includes both non-catalytic processing, e.g. steam cracking, and catalytic processing, e.g. catalytic cracking, in which the portion, or fraction, is contacted with a suitable catalyst. If hydrogen is present as a reactant, such process steps are typically referred to as hydroconversion and variously as hydroisomerization, hydrocracking, hydrodewaxing, hydrorefining and the like. More rigorous hydrorefining is typically referred to as hydrotreating. These reactions are conducted under conditions well documented in the literature for the hydroconversion of hydrocarbon feeds, including hydrocarbon feeds rich in paraffins. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels includes gasoline, diesel fuel and jet fuel, while lubricating oil includes automotive oil, jet oil, turbine oil and the like. Industrial oils include well drilling fluids, agricultural oils, heat transfer oils and the like.

It is understood that various other embodiments and modifications in the practice of the invention will be apparent to, and can be readily made by, those of ordinary skill in the art without departing form the scope and spirit of the invention as described above. Accordingly, it is not intended that the scope of the claims appended hereto be limited to the exact description set forth above, but rather that the claims be construed as encompassing all of the features of patentable novelty that reside in the present invention, including all the features and embodiments that would be treated as equivalents thereof by those skilled in the art to which the invention pertains. The invention is further described with reference to the following experimental work.

EXAMPLES

Catalyst Preparation

Example A (Support and Catalyst of the Invention)

(a) Titania Support

A titania support was prepared by spray-drying as follows. A slurry feed was prepared by mixing 34.4 parts (by weight) of Degussa P-25 fumed $TiO_2$, 8.8 parts alumina chlorhydrol sol (containing 23.5 wt % $Al_2O_3$), 0.6 parts silica sol (Nyacol 2034 DI, containing 35 wt % $SiO_2$), and 56.2 parts water. This mixture was fed to a 9 ft diameter spray-drier at a rate of about 13 lb/minute through a 9 inch wheel atomizer spinning at 10,000 rpm. The spray-drying chamber was operated with an inlet air temperature of about 285° C. and an outlet temperature of about 120° C. while spraying. The product consisted of solid spherical particles with an average size of about 60 microns and a composition of 94% $TiO_2$-5.4% $Al_2O_3$-0.6% $SiO_2$ by weight.

The spray-dried support was calcined in a rotary calciner at 732° C. to produce a support with the following properties: 24% of the $TiO_2$ in the rutile form, 48 $m^2/g$ surface area, and 0.50 cc/g water pore volume.

(b) Cobalt-Modified Titania Support

The titania support from (a) was impregnated with cobalt nitrate and calcined at high temperature to form a cobalt-modified support as follows. An aqueous cobalt nitrate solution containing 15 wt % Co was diluted by mixing 41.5 parts by weight with 18.0 parts of water. All of this solution was added to 95 parts of titania support from (a) in a V-blender mixer. The free-flowing product was calcined in air in a rotary calciner containing three heated zones, operated at 315° C., 427° C., and 454° C., respectively. This calcination served to dry the material and decompose the cobalt nitrate to $Co_3O_4$. The calcined support was then re-calcined in the rotary calciner at 870° C., which converted the cobalt oxide into cobalt aluminate and cobalt titanate. The blue-green colored final product had the following properties: 5.9 wt % Co, 1.02 Co/Al atomic ratio, 94% of the $TiO_2$ in the rutile form, 21 $m^2/g$ surface area, and 0.31 cc/g water pore volume.

(c) Co-Re Catalyst on Cobalt-Modified Titania Support

The cobalt-modified titania support from (b) was impregnated with cobalt nitrate and perrhenic acid to form a catalyst as follows. An impregnation solution was prepared by mixing 74.0 parts cobalt nitrate hexahydrate crystals, 1.8 parts perrhenic acid (containing 53.5 wt % Re), 5.6 parts malonic acid, and 18.6 parts water and heating the mixture to 43° C. to form a solution. By weight, 57.6 parts of this solution were added to 120 parts of cobalt-modified titania support from (b) in a V-blender mixer. The free-flowing product was calcined in air in the 3-zoned rotary calciner at 315° C., 371° C., 454° C., respectively. The calcined product was impregnated a second time using the same impregnation solution, with 53 parts solution being added to 128 parts catalyst, and then calcined by the same procedure. The final catalyst contained 15.2% Co and 0.68% Re.

In this example catalyst, 10.1% Co is in the active form of $Co_3O_4$, before activation by hydrogen reduction. The remainder of the cobalt, i.e., 5.1%, remains bound as the aluminate and titanate in the support.

Example B (Support and Catalyst of the Invention)

(a) Titania Support

A titania support was prepared by spray-drying as described in Example A, Part (a). The support was calcined in a rotary calciner at about 700° C. to produce a support with the following properties: 16% of the TiO2 in the rutile form, 44 m2/g surface area, and 0.52 cc/g water pore volume.

(b) Cobalt-Modified Titania Support

The titania support from (a) was impregnated with cobalt nitrate and calcined at high temperature to form a cobalt-modified support as follows. A 10.13 gram portion of cobalt nitrate hexahydrate was dissolved in de-ionized water and the total volume made to 51 ml. All of this solution was added in portions with good mixing to 100 grams of titania support from (a). The free-flowing product was calcined in air in a laboratory oven at 800° C. for 3 hours. This calcination served to dry the material and decompose the cobalt nitrate to Co3O4 during the heat-up and then convert the cobalt oxide into cobalt aluminate and cobalt titanate at the final temperature. The blue-colored product had the following properties: 1.93 wt % Co, 0.32 Co/Al atomic ratio, 66% of the TiO2 in the rutile form, 21 m2/g surface area, and 0.38 cc/g water pore volume.

(c) Co-Re Catalyst on Cobalt-Modified Titania Support

The cobalt-modified titania support from (b) was impregnated with cobalt nitrate and perrhenic acid to form a catalyst as follows. An impregnation solution was prepared by mixing 100 grams of an aqueous solution of cobalt nitrate containing 15 wt % Co with 2.52 grams of perrhenic acid containing 53.5 wt % Re. Twenty-seven (27) ml of this solution was added in portions with shaking to 70 grams of support from part (b) and the product calcined in air in an oven at 300° C. for 3 hours. A second impregnation was performed by adding 24.9 ml of the above solution to all of the material recovered from the first impregnation and calcination. The product was calcined in air in an oven at 300° C. for 3 hours. The final catalyst contained 14.8% Co and 1.17% Re. In this example catalyst, 13.2% Co is in the active form of Co3O4, before activation by hydrogen reduction. The remainder of the cobalt, i.e. 1.6%, remains bound as the aluminate in the support.

Example C (Reference Catalyst)

A reference catalyst was prepared by impregnating a rutile titania support with cobalt nitrate and perrhenic acid as follows. First, a titania support was prepared by spray-drying as described in Example A, Part (a) above. The support was calcined in a rotary calciner at about 1010° C. and contained 95% of the $TiO_2$ in the rutile form. The calcined support was impregnated with an aqueous solution of cobalt nitrate and perrhenic acid and calcined in air at 454° C. A second impregnation and calcination was applied to produce a final catalyst containing 11.3% Co and 1.09% Re.

Catalyst Characterization (a) In order to maximize the formation of heavier hydrocarbons as claimed in this invention, it is important that any alumina present as a binder in the titania support be converted to cobalt aluminate during the final calcination of the cobalt-modified support. This conversion is accompanied by an obvious color change; the finished Co-modified support of Example A, Part (b) is greenish blue compared to the white titania starting material. A convenient way to more definitively monitor the formation and presence of cobalt aluminate and titanate is to analyze the support and/or catalyst by a temperature programmed reduction technique, especially by thermal gravimetric analysis (TGA). For example, FIG. 1 shows the weight losses that occur as the support and catalyst from Example A and catalyst of Example C are heated to 900° C. in hydrogen (10° C./minute ramp rate). As noted on the figure, the presence of titanate ($CoTiO_3$) and aluminate ($CoAl_2O_4$) are easily distinguished from cobalt oxide ($Co_3O_4$) since each phase reduces in a distinctly different temperature region. The Co-modified titania support from Example A part (b) contains sufficient cobalt to convert all alumina to aluminate and a small portion of the titania to titanate.

(b) The cobalt-modified supports and the base case titania support were tested for solubility in 0.01 M nitric acid. Samples were soaked in 2-10 parts by weight of the acid for 10-45 minutes, then centrifuged and the solution analyzed for dissolved cations by Inductively Coupled Plasma Electron Spectroscopy (ICPES). Results are summarized in Table 1. For Example A, the alumina part of the support is rendered less soluble, but the titania part (the major component) is rendered more soluble by modification with cobalt. For Example B, both the alumina and the titania are rendered more soluble by the cobalt incorporation. Note that the solubilities of the alumina and titania are very low on both the base case and Co-modified supports.

Hydrocarbon Synthesis Tests of Catalysts from Examples A and C

Catalysts from Example A (invention) and Example C (reference) were activated by reduction in pure hydrogen at 250 psig in a fluidized bed. Standard gas hourly space velocity was about 10,000. Temperature was ramped at 11° C. per hour to a final temperature of 371° C., which was held for about 4 hours. Note that at the final temperature used in activation, only the cobalt oxide is reduced to active cobalt metal. The cobalt present as aluminate and titanate remain in these forms on the activated catalyst.

Catalysts were tested for Hydrocarbon Synthesis in a 6 inch diameter slurry bubble column reactor, operating at 210° C. and 275 psig. Table 2 summarizes operating variables and product selectivities determined for the catalysts of Example A (invention) and Example C (reference). In the table, GHSV refers to the volume of syngas, at standard conditions, per hour per volume of catalyst. Methane selectivity, mol % $CH_4$, is the mole percent of methane formed per mole of CO converted. Alpha was determined from the linear regression, on a semilog plot, of alkane carbon number distribution from C20 to C50, obtained by gas chromatography. The wt % of hydrocarbons boiling above 700° F. (371° C.) was determined by distillation.

Figure 2:
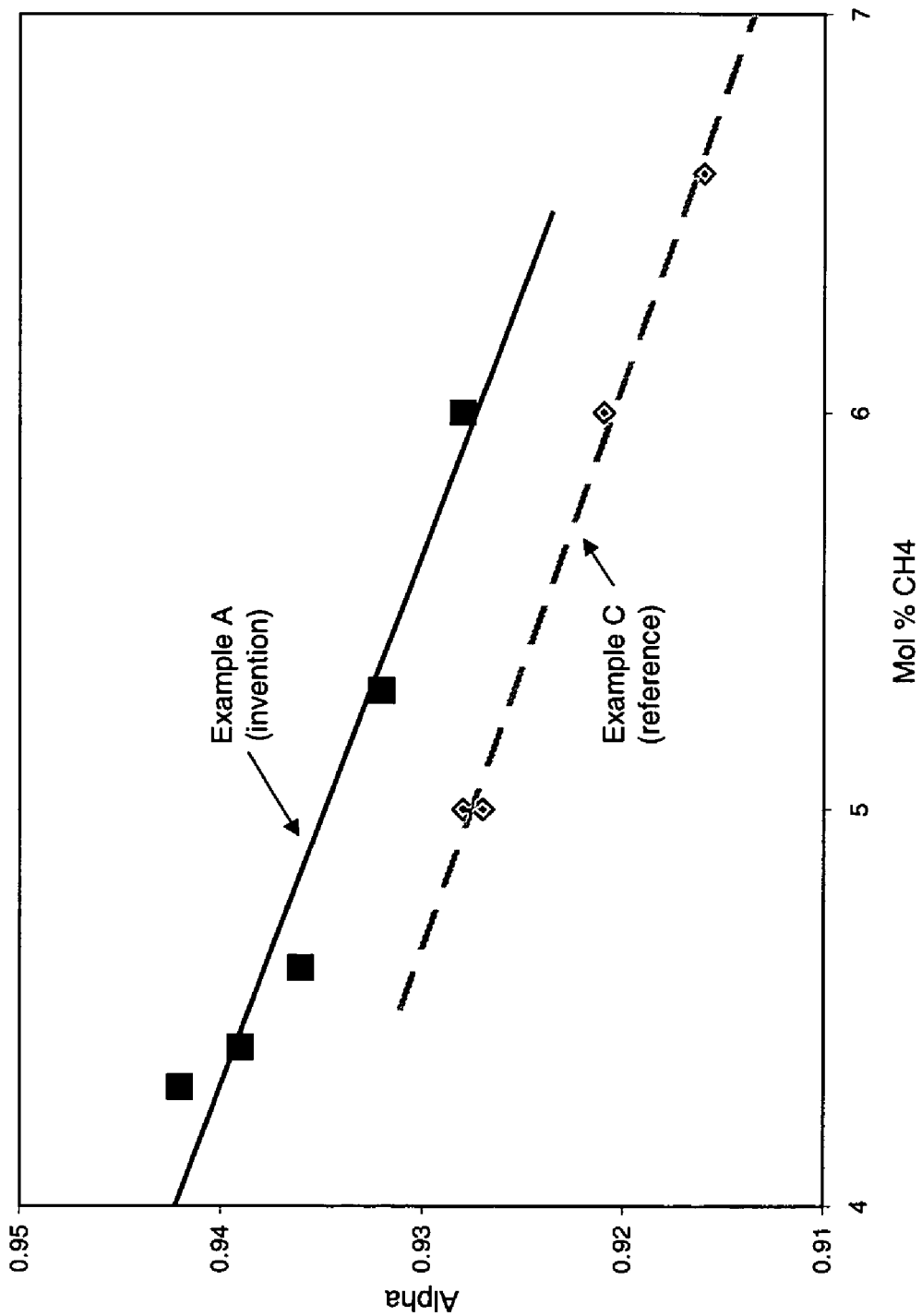
Figure 3:
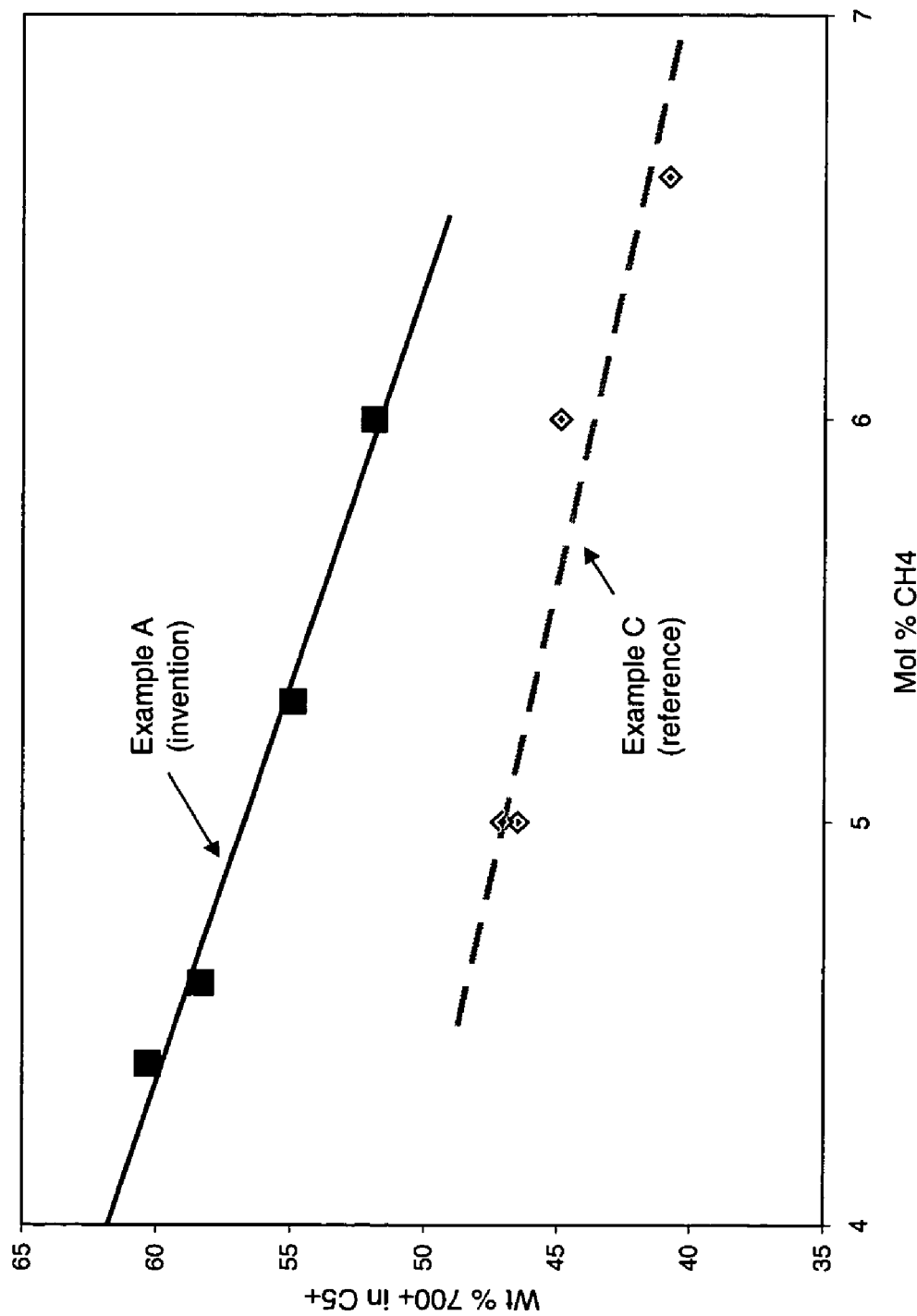

It is known in the art that Fischer-Tropsch product selectivity depends on the catalyst and on the operating conditions, such as temperature, pressure, $H_2$/CO ratio, conversion level, etc. One simple way of separating the effect of the catalyst from the effect of process variables is to construct a plot of product distribution versus methane selectivity. Such plots are shown in FIGS. 2 and 3, based on the selectivity data given in Table 2. The alpha values are plotted versus methane selectivity in FIG. 2. The 700° F.+ fraction in the $C_5$+ hydrocarbons are plotted versus methane selectivity in FIG. 3. The range in methane selectivity is produced by process variables, mainly conversion level in this case. Both figures clearly show a significant shift to heavier hydrocarbons, at any given methane selectivity, for the catalyst of the invention compared to the reference catalyst. The difference in 700° F.+ yield observed, generally over 10%, is a very significant increase and will translate directly into higher yield of premium lube basestock after wax isomerization.

Hydrocarbon Synthesis Tests of Catalysts from Examples B and C

The catalysts of Example B (invention) and Example C (reference) were tested in a fixed bed pilot plant. The run of Example B catalyst was made by charging 15.0 grams of catalyst and 177.6 grams of titania diluent to a tubular reactor (0.75 inch schedule 80 pipe, 304SS). The charge was reduced in hydrogen at 375° C. and run with 2.1 H2/CO syn gas at 280 psig average pressure. The base run was made in the same manner using 16.15 grams of Example C catalyst and 101.75 grams of titania diluent. Four hydrocarbon product samples were taken over the course of ten day periods in each run, were analyzed by gas chromatography, and the alpha value calculated from the C20-C45 carbon number range. Results are summarized in Table 3. The catalyst of the invention produced a wax with 0.02 higher alpha and about 1% less methane than the reference case. The alpha credit corresponds to an increase in 700 F+ hydrocarbon yield of about 15%.

TABLE 1

| Support | SA, $m^2/g$ | ppm of support dissolved as . . . | | Micrograms Per $m^2$ | |
|---|---|---|---|---|---|
| | | Al | Ti | Al | Ti |
| Example A (invention) | 21 | 70 | 5.2 | 3.3 | 0.25 |
| Example B (invention) | 21 | 534 | 27 | 25 | 1.3 |
| Example C (reference) | 14 | 133 | <0.2 | 9.5 | <0.014 |

TABLE 2

| $H_2$/CO Feed ratio | GHSV | % CO conversion | Mol % $CH_4$ | Alpha | Wt % 700+ in $C_5$+ |
|---|---|---|---|---|---|
| Example A | | | | | |
| 2.1 | 9250 | 72 | 4.4 | 0.939 | 60.3 |
| 2.1 | 9450 | 53 | 5.3 | 0.932 | 54.9 |
| 2.1 | 9450 | 44 | 6.0 | 0.928 | 51.9 |
| 1.95 | 5890 | 58 | 4.3 | 0.942 | — |
| 1.95 | 5890 | 54 | 4.6 | 0.936 | 58.3 |
| Example C | | | | | |
| 2.1 | 11650 | 50 | 5.0 | 0.928 | 46.5 |
| 2.1 | 11600 | 50 | 5.0 | 0.927 | 47.1 |
| 2.1 | 11760 | 43 | 6.0 | 0.921 | 44.9 |
| 2.1 | 11750 | 35 | 6.6 | 0.916 | 40.8 |

TABLE 3

| Catalyst | Example B | Example C |
|---|---|---|
| Temperature,° C. | 213 | 213 |
| GHSV | 4477 | 7350 |
| % CO Conversion | 56 | 64 |
| Mole % CH4 | 5.9 | 6.8 |
| Alpha | 0.94 | 0.92 |

What is claimed is:

1. A catalyst support composition which comprises:
a major amount of titania; and
at least 3 to less than 30 wt % of a binder comprising cobalt aluminate, wherein the atomic ratio of cobalt to aluminum in the composition is greater than 0.25.

2. The composition of claim 1 wherein said atomic ratio is about 0.5.

3. The composition of claim 1 containing about 0 wt % alumina.

4. The composition of claim 1 wherein the binder includes alumina.

5. The composition of claim 4 wherein the binder includes silica in an amount less than 50 wt % of the total amount of the binder.

6. A method for preparing a catalyst support composition comprising:
   spray drying a material comprising a major amount of titania and a minor amount of alumina to form spray dried product;
   incorporating a cobalt compound into the spray dried product to obtain a cobalt containing material, the cobalt compound being incorporated in an amount sufficient to convert, upon calcination, at least part of the alumina to cobalt aluminate; and
   calcining the cobalt containing material to form a binder material having at least 3 wt % to less than 30 wt % of cobalt aluminate on said catalyst support composition.

7. The method of claim 6 wherein the calcining of the spray dried product in air is at about 700° C. to about 1000° C. after incorporating the cobalt compound.

8. The method of claim 7 wherein the amount of cobalt compound added is sufficient to provide a Co/Al atomic ratio in the range of 0.25:1 to 2:1.

9. The method of claim 8 wherein the cobalt compound is incorporated in an amount sufficient to convert, upon calcination, substantially all the alumina to cobalt aluminate.

10. The method of claim 9 wherein the cobalt compound is cobalt nitrate.

11. The method of claim 9 wherein the cobalt containing material is calcined in air at temperature in the range of about 800° C. to about 900° C.

12. A Fischer-Tropsch catalyst composition comprising a catalytic metal selected from the group consisting essentially of cobalt, rhenium and mixtures thereof on a support comprising a major amount of titania and at least 3 to less than 30 wt % of a binder comprising cobalt aluminate, wherein the atomic ratio of cobalt to aluminum in the binder is greater than 0.25.

13. The catalyst of claim 12 wherein the catalytic metal is cobalt and wherein the atomic ratio of cobalt to aluminum in the binder is in the range of 0.25:1 to 2:1.

14. The catalyst of claim 13 wherein the binder includes silica in an amount less than 50 wt % of the total weight of the binder.

* * * * *